(No Model.)

H. B. MEECH.
PROCESS OF REDUCING ORES.

No. 250,377.  Patented Dec. 6, 1881.

2 Sheets—Sheet 1.

Witnesses.  Inventor.

(No Model.) 2 Sheets—Sheet 2.

H. B. MEECH.
PROCESS OF REDUCING ORES.

No. 250,377. Patented Dec. 6, 1881.

Witnesses.
Inventor.

UNITED STATES PATENT OFFICE.

HARRISON B. MEECH, OF CHATHAM VILLAGE, NEW YORK.

PROCESS OF REDUCING ORES.

SPECIFICATION forming part of Letters Patent No. 250,377, dated December 6, 1881.

Application filed April 16, 1881. (No model.)

*To all whom it may concern:*

Be it known that I, HARRISON B. MEECH, of Chatham Village, in the county of Columbia and State of New York, have invented certain new and useful Improvements in Reducing Ores; and I do hereby declare the following to be a full, clear, and exact description of the invention, such as will enable others skilled in the art to which it pertains to make and use it, reference being had to the accompanying drawings, which form part of this specification.

My invention relates to an improvement in ore-reducing machines; and it consists in the combination of a closed pan, in which are placed revolving mullers, and which pan is so constructed that heat and chemicals can both be applied to the ore while it is being reduced, and thus enable the reduction, the action of the chemicals and the action of a high temperature to take place at the same time.

The object of my invention is to provide an apparatus that is so constructed that gold and other metals may be separated from rebellious pyrites ores; that tailings or a low grade of ore may be worked without the expense of smelting works, and so that miners of small capital may be able to work ores with economy and profit.

Figure 1:
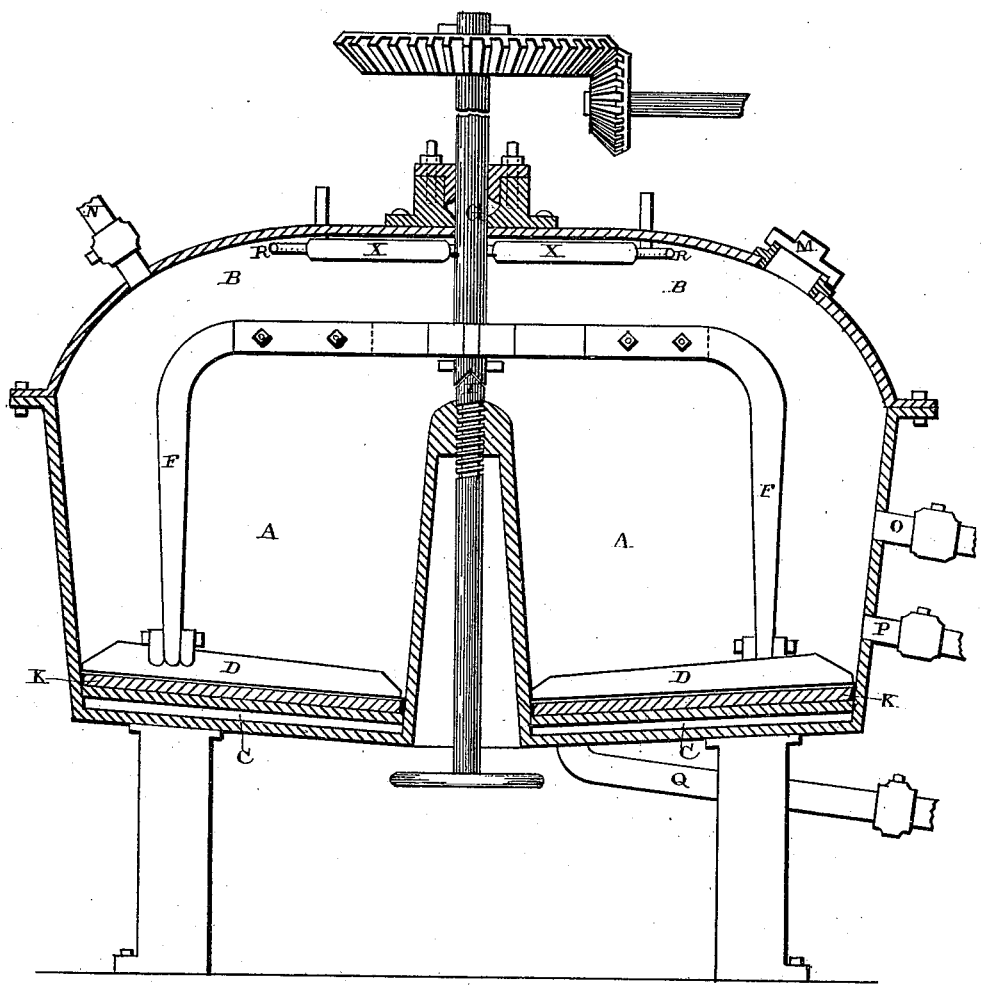
Figure 2:
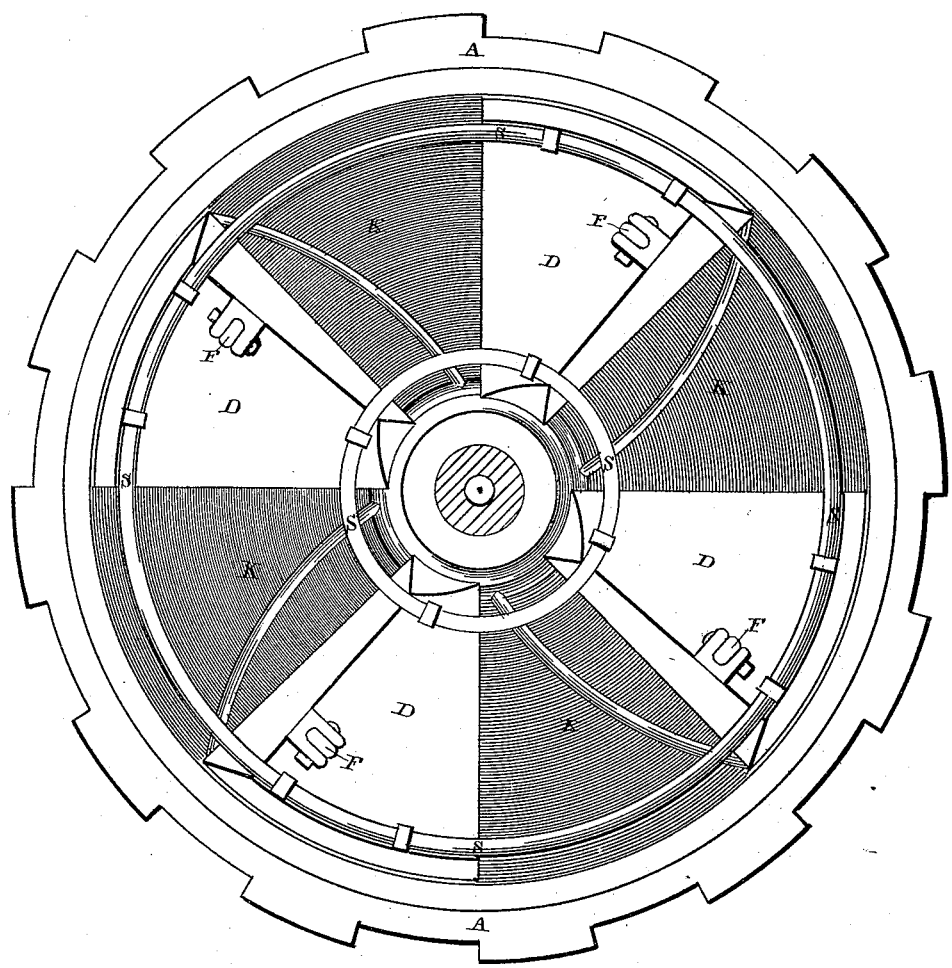
Figure 3:
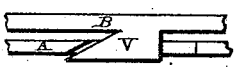

Figure 1 is a vertical section of my invention. Fig. 2 is a plan view of the pan, showing the cover removed. Fig. 3 is a detail view of the fastening for securing the top in position.

A represents a circular pan, provided with a double bottom. A suitable space, C, is left between the two bottoms for the purpose of admitting steam into it for heating the contents of the pan. This pan is provided with a cover, B, which closes the pan steam-tight. Passing down through the cover is the packed driving-shaft G, to which are secured a number of arms, F, and to the lower ends of these arms are secured the mullers D, which are driven around the center-post of the pan for the purpose of grinding the ore as the shaft is made to revolve.

Upon the bottom of the pan is placed a surface-plate, K, which protects the bottom of the pan from being worn out by the mullers. This shaft rests upon the step I, which can be adjusted vertically by means of a suitable screw, and thus the mullers can be allowed to exert their whole weight upon the bottom of the pan, or can be raised upward so as to exert but very little pressure. The bottom of the pan and the surface-plate K are inclined toward the center of the pan to counteract the centrifugal force of the mullers, which have a tendency to force the ore against the outer edge of the pan.

If so desired, curved sheet-metal breakers may be attached to the inner side of the pan, for the purpose of throwing back toward its center the ore which is thrown against them by means of the mullers.

The plate K and the mullers D are made with chilled-iron faces, which, when worn out, can be readily replaced by others.

Through the top of the pan is made a man-hole, M, for admitting the pulverized ore and chemicals. The top is also provided with a pipe, N, to admit water or chemicals, as may be desired.

The kind and quantity of chemicals introduced into the pan will vary according to the kind of ores to be treated and the amount of heat used. The chemicals that will answer in one case will not answer in another, and hence no particular kind are here given and described.

Extending from the side of the pan is a pipe, O, to draw off the muddy water, and a suitable distance lower down is placed a second pipe for drawing off the mud-pulp. Extending outward from the bottom of the pan is a pipe, Q, through which the whole contents of the pan is drawn off. Secured to the under side of the cover B is a perforated pipe, R, for the purpose of admitting cold water for cooling and settling the contents before being drawn off.

The tops of the mullers are made inclined and slope backward from one edge down to the opposite one, so that the ore will not lodge upon their tops, and all of the mullers are connected together by the circular rods S. The lower ends of the arms F F are connected to the mullers by means of suitable clutches or other fastenings which can be readily removed.

The top B may be secured to the pan by means of bolts; or there may be suitable holes made through the flange which extends around the top of the pan, and through these holes will be passed the clutches V. (Shown in Fig. 3.) As the shaft is packed where it passes through the cover B, when the shaft is made to revolve it will exert a constant pressure upon the cover, and this pressure will cause the inclined surface of the clutches V to tighten the cover down upon the top of the pan. Of course, the more rapidly the shaft is made to revolve the greater its pressure upon the cover and the more tightly the cover will be held in position. When it is desired to remove the cover, the cover will have to be turned backward a certain distance at first before it can be raised upward. All of the joints around this pan will be suitably packed, so as to make it absolutely steam-tight.

Secured to the under side of the cover is a condensing-cooler, X, through which cold water is passed for the purpose of condensing the steam in the pan, and around this condensing-pipe is placed the perforated pipe R, for the circulation of cold water while the apparatus is in operation for the purpose of precipitating the evaporated chemicals and metals.

The operation of my machine is as follows: A certain amount of water is introduced into the apparatus, and then a regulated amount of pulverized ore from stamp-mills or other pulverizing-machines, or the tailings, or the concentrated parts of the ore are then introduced into the machine, with the water and a regulated amount of chemicals that may be required, according to the quality of ore to be treated. Then the mass is heated by steam admitted into the space C between the double bottoms of the pan; or the steam may be admitted direct into the mass, or it may be heated by fire underneath the pan; but I prefer the former, as it does not dilute the mass. The degree of heat used will vary according to the kind of ore to be treated. Where the ore is very rebellious the degree of heat will be very high and cause an enormous pressure within the pan. I prefer to keep the pulp at about the consistency of mud, and hence prefer not to introduce the steam into the pan. The mass is ground and boiled a suitable length of time, which varies according to the ore to be treated.

The consistency of the pulp can be tested by drawing some of it out into a cup attached to one of the outlet-pipes. Cold water is then admitted from the pipe R, which cools and precipitates the vapors, and then the water and mud are drawn off through the pipes O P. The pan is refilled with water and ore, as before, and this operation can be continued indefinitely. The kind and proportion of the chemicals I use are varied according to the kind and quality of ore to be treated.

It will be seen from the above description that none of the gold or silver can be lost by being carried off with the vapor; that the ore is reduced and subjected to the action of chemicals, a high temperature, and pressure at the same time. Where the pan is not covered as shown, a very fine gold, commonly known as "float gold," is apt to be carried off in the vapors and lost. By inclosing the ore in a closed vessel it can neither fly nor be washed away, and being boiled and ground under a high temperature at the same time that it is acted upon by chemicals, a sure decomposition takes place. By reducing and chloridizing the sulphurets of iron, copper, arsenic, and antimony that may be in the ore, and then grinding or melting them, the rebellious substances of the ore are reduced to a fine solution, whereby the fine particles of gold are freed and cleansed when they are precipitated.

Having thus described my invention, I claim—

1. The method described of boiling and grinding ores at the same time under a high temperature, substantially as described.

2. The method described of boiling and grinding ores under a high temperature with chemicals, substantially as set forth.

In testimony whereof I affix my signature in presence of two witnesses.

HARRISON B. MEECH.

Witnesses:
A. C. KISKADDEN,
F. A. LEHMANN.